United States Patent [19]

Angel

[11] Patent Number: 4,993,506
[45] Date of Patent: Feb. 19, 1991

[54] MASS-PRODUCED FLAT ONE-PIECE LOAD CELL AND SCALES INCORPORATING IT

[76] Inventor: Shlomo Angel, 205 West 15th St., New York, N.Y. 10011

[21] Appl. No.: 448,672

[22] Filed: Dec. 11, 1989

[51] Int. Cl.⁵ .................. G01G 3/14; G01G 3/08; G01L 1/22
[52] U.S. Cl. .................. 177/211; 177/229; 73/862.65
[58] Field of Search .................. 177/211, 229; 73/862.65

[56] References Cited

U.S. PATENT DOCUMENTS

| | | | |
|---|---|---|---|
| 4,289,036 | 9/1981 | Barker | 73/862.65 X |
| 4,548,086 | 10/1985 | Kastel | 73/862.65 |
| 4,848,493 | 7/1989 | Hitchrock | 177/211 |

FOREIGN PATENT DOCUMENTS

| | | | |
|---|---|---|---|
| 54-124770 | 9/1979 | Japan | 73/862.65 |
| 6409067 | 12/1965 | Netherlands | |

Primary Examiner—George H. Miller, Jr.
Attorney, Agent, or Firm—Bryan, Cave, McPheeters & McRoberts

[57] ABSTRACT

This invention relates to an accurate load cell for use in mass-produced weighing devices, particularly in low-profile scales incorporating a plurality of load cells. The load cell is made from one flat piece of metal, possibly a single metal stamping, consisting of three structural elements: (1) A flat flexure beam, possibly with a narrow mid-section, on which strain sensors are bonded; (2) A flat U-shaped loaded element attached at its inner mid-section to one end of the flexure beam, with the two leading edges of the U-shaped loading element reaching beyond the mid-point of the middle beam; and (3) A flat mounting element attached at its mid-section to the other end of the flexure beam. The mounting element can also be U-shaped, with the two leading edges of the U-shaped mounting element reaching beyond the mid-point of the middle beam on the outside of the U-shaped loading element.

5 Claims, 4 Drawing Sheets

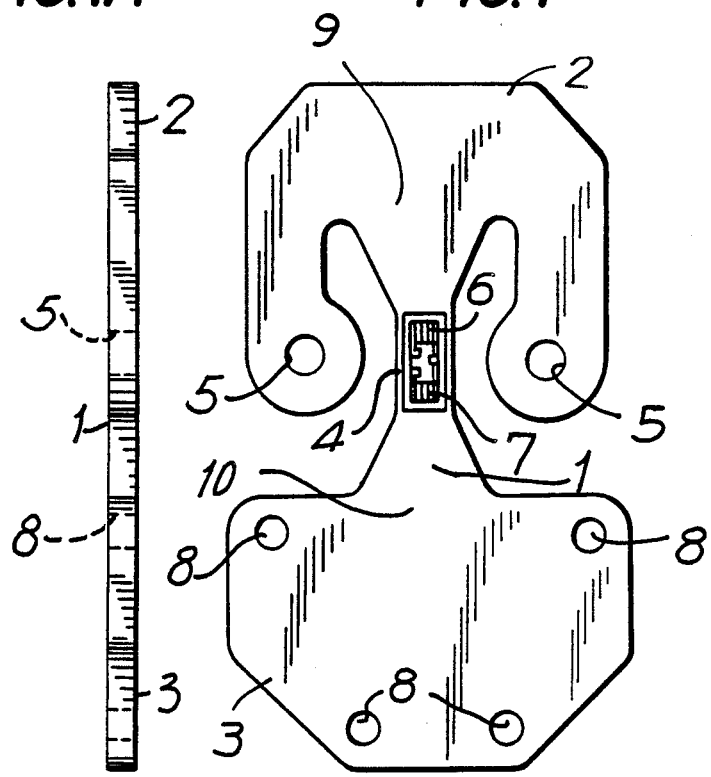
FIG. 1A    FIG. 1
FIG. 1B
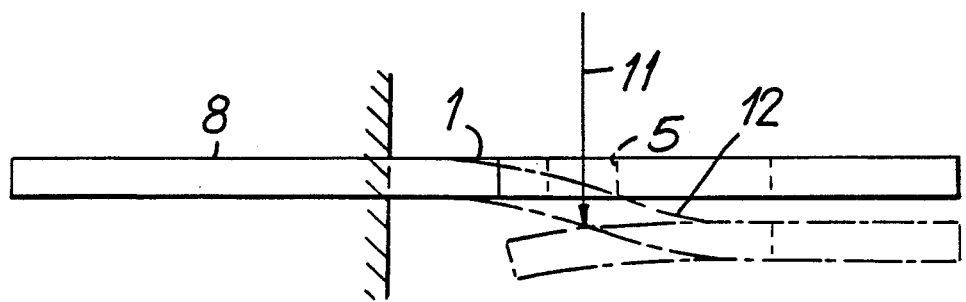
FIG. 2

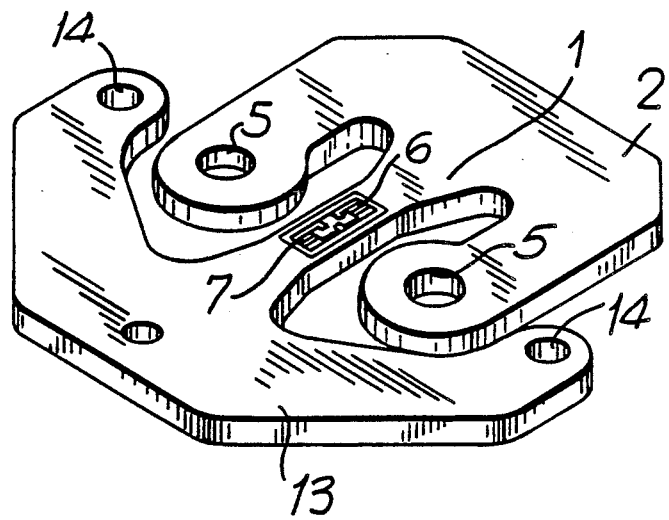
FIG. 3
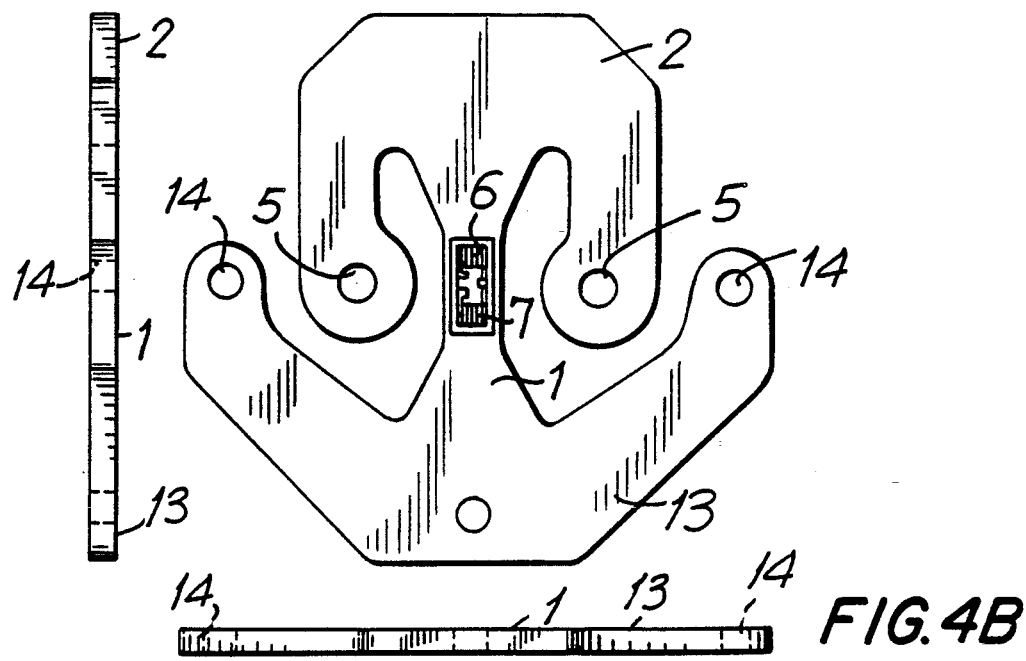
FIG. 4A   FIG. 4
FIG. 4B

MASS-PRODUCED FLAT ONE-PIECE LOAD CELL AND SCALES INCORPORATING IT

BACKGROUND OF THE INVENTION

1. Field of the Invention

This invention relates to an accurate low-cost load cell for use in mass-produced weighing devices—such as scales for weighing persons, packages, mail or kitchen items—and to scales and other devices incorporating such a load cell, particularly, but not necessarily, limited to scales in which either (a) the design of the scale calls for the use of a plurality of load cells - e.g. four - requiring the maximum reduction of cost per load cell; or (b) where the design of the scale calls for a low-profile load cell, e.g. less than 0.125" in thickness; or both.

2. Description of the Prior Art

Most electronic scale in wide use, and particularly in consumer use for personal weight measurement, use a set of levers which transmit the load on a load bearing plate to a single load cell. The load cell is usually composed of two elements: a mechanically-deformable element acting as a force transducer, and an electronic strain sensor which transforms the mechanical deformation into an electrical signal proportional to the load on the plate.

The lever mechanisms impose minimum thickness requirements on such scales, and limit their accuracy.

There is a different and more accurate principle for constructing scales—particularly scales with a low-profile design—which does not require any levers, and which has been in industrial and commercial use for some time. It involves placing a rigid load bearing plate on a plurality of load cells, and summing up the electrical signals from these load cells to obtain an accurate measure of the total load on the plate. Although several patents have been issued for portable electronic scales for consumer and commercial use embodying this principle—e.g., U.S. Pat. No. 4,335,692 issued to Osterlich, U.S. Pat. No. 4,394,079 issued to Brendel, U.S. Pat. No. 4,411,327 issued to Lockery, U.S. Pat. No. 4,739,848 issued to Tulloch, and U.S. Pat. No. 4,800,973 issued to the present inventor—none of these inventions has come into wide commercial use, in part because of the prohibitive cost of producing, for each scale, four accurate load cells with near-equal sensitivity.

The basic requirements for accurate, mass produced load cells for use in such embodiments are:

(a) The load cells must be insensitive to transverse forces acting on them;

(b) The load cells in a given scale must be of near-equal sensitivity to ensure that the reading remains within the allowed margin of error when the load bearing plate is subject to eccentric loads;

(c) The mechanical elements of the load cells should not require significant machining or manual labor in assembly;

(d) The load cells should not require individual trimming once they are mounted in a scale;

(e) The load cells should be protectible against impact and overload;

(f) Particularly when the scale plate or plates to which the load cells are to be attached is of limited rigidity, the load cells should not create strong forces or bending moments on the plates;

(g) It should be possible to bond the electronic strain sensors—be they strain gages, thick film resistors or semi-conductors—to the mechanical element of the load cell in a simple fashion, e.g. directly on to one side of a flat exposed surface.

The prior art devices do not provide simple means of equalizing the sensitivity of individual load cells. Unequal sensitivity will usually result in a considerable reduction in the repeatability of measurements, especially when loads are placed in different locations on the load bearing platform. Correcting this flaw usually requires one of two known procedures:

(a) Manual calibration of each load cell after it is mounted in a scale, changing the dimensions of the gaged beam by trimming, filing or grinding; or (b) Pre-programming a micro-processor in each scale with the initial sensitivity of each load cell.

Both procedures are cumbersome and expensive operations, usually unsuitable for consumer-oriented manufacturing.

Tulloch, Osterlich and Ryckman do not disclose means for retaining accuracy under eccentric loads, beyond the use of knife-edge mechanisms for ensuring that the loads on the load cells remain in the same general area. These knife-edge arrangements are known to be imprecise, and the knife-edges tend to lose their sharpness over time. The low-profile scale described in my prior patent, U.S. Pat. No. 4,800,973, also uses load cells which cannot retain their accuracy when subject to eccentric loads.

Brendel and Lockery use a well-known double-cantilever arrangement for retaining precision under eccentric load conditions by locating two strain gages on each flexure beam—one exposed to tension and one to compression of equal magnitude—so that additional moments created by transverse forces are cancelled.

The principle embodied in double-cantilever arrangements is described in detail in U.S. Pat. No. 4,565,555 issued to Sarrazin, for example, and forms part of the disclosure in U.S. Pat. No. 4,020,686 issued to Brendel: The signal generated by the two strain sensors bonded to the flexure beam is proportional to the sum of the bending moments on the beam at the center points of the gages. Since the sensors are located on the main axis of the middle beam, equi-distant from its mid-point, a force pressing on the leading edges of the U-shaped loading element is proportional to the product of the force and the distance between the sensors. Since the distance between the sensors is fixed, the signal will be proportional to the force even if the force is not exactly at the center of the flexure beam.

Each load cell forms at least half a Wheatstone Bridge, and four load cells, for example, can form a complete Wheatstone Bridge with two strain sensors on each arm of the bridge. For greater accuracy, two sensors can be bonded to both the top and the bottom of the flexure beam to form a complete Wheatstone Bridge for each load cell.

The load cells described in the embodiments disclosed by Lockery and Brendel, however, are not suitable for mass production. They contain a plurality of parts and require considerable machining, grinding, tapping, screwing, assembly and post-mounting trimming operations which increase their costs of production significantly.

The load cells described by Brendel and Lockery also create significant moments on the plates to which they are attached. This requires the plates to be able to resist these moments.

Such arrangements are not suitable for lighter-weight scales with weaker plates, or for very thin plates.

One or more of the limitations discussed above: inability to cancel transverse forces; difficulty in equalizing load-cell sensitivity; a multiplicity of machined parts requiring assembly; absence of impact and overload protection; and the creation of significant bending moments on the plates to which the load cells are attached have been found in all known embodiments for scales using a plurality of load cells, making it difficult to produce such scales for consumer use which would be both affordable and accurate, and making it particularly difficult to produce thin and light-weight scales which are truly portable.

SUMMARY OF THE INVENTION

The manufacturing and accuracy limitations of the prior art are overcome by the present invention, making it possible to produce a low-cost accurate load cell which is particularly suitable for use in mass-produced scales requiring more than one load cell. In particular, the load cell of the invention comprises:

a. a one-piece, flat, mechanically-deformable metal part, comprising
   (1) A flat flexure beam on which strain sensors are bonded;
   (2) A flat U-shaped loading element attached at its inner mid-section to one end of the flexure beam, with the leading edges of the U-shaped element reaching beyond the mid-point of the flexure beam, the U-shaped element being loadable at two points opposite each other across the mid-point of the flexure beam; and
   (3) A flat mounting element, wider than the flexure beam, attached at its mid-section to the other end of the flexure beam, the mounting element being fastenable to a plurality of flat protrusions on a rigid surface;

so that
   the flexure beam bends under load as a double cantilever beam into a symmetrical S-shape, producing stresses of equal and opposite sign at points equidistant from its mid-point along its main axis; and b. At least one pair of strain sensors mounted on at least one of the flat surfaces of the flexure beam, with their centers substantially along its main axis and substantially equi-distant from its mid-point, each pair of sensors forming half a Wheatstone Bridge and producing signals of nominally equal and opposite values when the load cell is under load.

The load cell of the present invention provides for a very high degree of accuracy—e.g., less than 0.05% non-linearity, hysteresis and non-repeatability, and less than 0.1% rejection of eccentric loads when mounted in a scale assembly. Yet the load cell can be mass-produced at a very low-cost—e.g., for approximately two dollars—while a commercial load cell of comparable performance may cost several hundred dollars.

The load cell hereof uses the well-known double cantilever arrangement for cancelling transverse loads, and thus retains its accuracy when subject to eccentric loads. However, while earlier disclosures of the double-cantilever arrangement have beams arranged on top of one another, the present invention creates a double-cantilever arrangement in a single plane.

This makes it possible for the mechanical element of the load cell to be a single flat metal part which can be accurately stamped in one operation, eliminating all manual labor and complex machining. The electronic strain sensors are then bonded to the flat surface of the flexure beam and wires ar soldered to them in a second operation which completes the load cell. The flatness of the mechanical element considerably simplifies the bonding operation.

To retain the repeatability of measurements under eccentric loads, a plurality of load cells attached to a single load bearing plate must each have near equal sensitivity. This is achieved in the present embodiment by not attaching the areas on the mounting element and the loading element which are close to the flexure beam directly to the scale plates. By so providing, the sensitivity of the load cell remains the same before and after attachment to the plates.

This feature makes it possible to sort a large number of load cells into groups of near-equal sensitivity in a separate operation, for later assembly into complete scales. This operation, which involves determining the milivolt-per volt output of each load cell when subject to a given load and grouping load cells of near-equal output, further simplifies production by eliminating the need for trimming the individual load cells, once they are mounted on a scale, in order to adJust their sensitivity.

The use of a plurality of such load cells considerably simplifies the design and production of scales, significantly reducing the number of parts and almost entirely eliminating the demands for space inside the scale for mechanical elements altogether. The thickness of scales may thus be determined only by the structural and aesthetic requirements of the plates used, and the electronic components and batteries inserted.

A typical low-profile scale embodying a plurality of load cells of the present invention comprises a. A plurality of said load cells;
b. A rigid bottom plate to which the mounting elements of the load cells are fastened on a plurality of flat protrusions;
c. At least two impact-resistant pads attached to the top surfaces of the leading edges of the U-shaped loading element and centered at points opposite each other across the mid-point of the flexure beam of each load cell;
d. A rigid top load bearing plate resting on and affixed to the impact resistant pads of the plurality of load cells;
e. Electronic means and power supply means for summing the output of the plurality of load cells, converting it to a digital signal, translating the digital signal into pounds or kilograms and displaying the resulting weight for viewing.

In such a scale, the space between the two plates can be used to house the electronic components and the batteries. This type of scale can be used on thick carpets or uneven surfaces, for example, because the bottom plate acts as a flat surface against which the load cells are pressing.

The load cells of the present invention deflect appreciably when the scale is fully loaded, making it possible to provide for adjustable screws in the bottom plate that act as overload stops. The pads between the load cell and the top load bearing plate resist impact, as well as cancel the effects of transverse loads created by the top plate. Both arrangements protect the load cells from damage.

The flat load cell of the present invention can be very thin—e.g., less than 0.100" for a load cell used in a person-weighing scale, or less than 0.050" for a load cell used in a kitchen scale—making it possible to greatly reduce the thickness of scales. It is also very light—e.g. of the order of one ounce—making it useful in lightweight scales, such as the scale disclosed in my U.S. Pat. No. 4,800,973, issued in January of 1989.

Where the application of the load cell in a scale requires the use of lighter-weight and less rigid scale plates or very thin plates, such as the one disclosed in my aforesaid U.S. Pat. No. 4,800,973, it is preferable to use a modified embodiment of the load cell of the present invention wherein the mounting element is also a U-shaped element attached at its inner mid-section to the one end of the flexure beam, with the leading edges of the U-shaped mounting element reaching beyond the mid-point of the flexure beam on the outside of the U-shaped loading element, so that the U-shaped mounting element, when attached to a rigid plate, does not create moments on the rigid plate when the load cell is under load.

A low-profile scale embodying a plurality of such load cells comprises:

a. A rigid load bearing composite plate assembly made of top and bottom thin plates rigidly bonded together, and containing a plurality of cavities between the two plates;

b. A plurality of the said load cells mounted inside the cavities of the load bearing plate assembly, the U-shaped mounting elements of the respective load cells being rigidly anchored with spacers to the top and bottom plates so that the load cells float inside the respective cavities;

c. Shallow feet connected to the bottom of each U-shaped loading element at points opposite each other across the mid-point of the respective flexure beam through holes in the bottom plate, each foot comprising:

1. At least two spacers extending downwards from the leading edges of the U-shaped loading element;

2. A rigid bridge across the bottom of the flexure beam connecting the bottom of the two spacers below the bottom plate; and 3. An impact-resistant pad attached to the bottom of the bridge, touching the floor at a point below the center of the flexure beam; and d. Electronic means and power supply means for summing the output of the plurality of load cells, converting it to a digital signal, translating the digital signal into pounds or kilograms and displaying the resulting weight for viewing.

In this embodiment, the bridge under the bottom plate acts for overload protection by touching the bottom plate from below when the scale is overloaded. The soft material attached to the bottom of the bridge resists impact and both features protect the load cells from damage.

BRIEF DESCRIPTION OF THE DRAWINGS

FIG. 1 is a top plan view and FIGS. 1A and 1B are side views of an embodiment of a load cell in accordance with the present invention.

FIG. 2 is a schematic illustration of the deformation of the load cell shown in side view in FIG. 1A when it is under load.

FIG. 3 is an isometric view of a preferred embodiment of a load cell in accordance with the present invention.

FIG. 4 is a top plan view and FIGS. 4A and 4B are side views of the preferred embodiment of the load cell shown in FIG. 3.

DESCRIPTION OF THE PREFERRED EMBODIMENT

Figure 5:
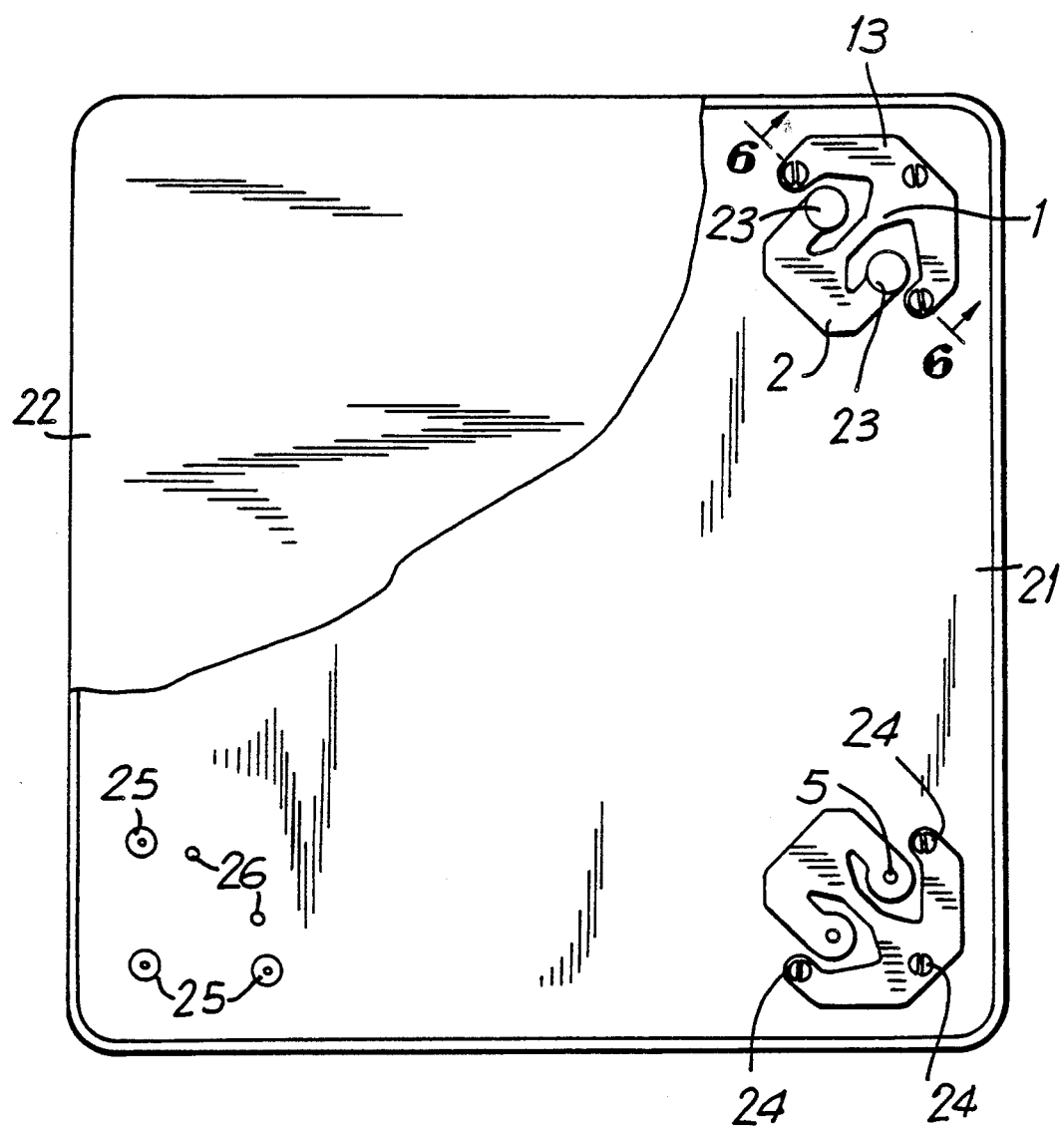
FIG. 5 is a top plan view of a preferred embodiment of a scale employing a plurality of load cells illustrated in FIGS. 4, 4A and 4B, with the upper load-bearing platform partially broken away and with three of the four corners illustrated in various degree of incompleteness to reveal additional structural details.

Referring first to FIGS. 1. 1A and 1B, there are shown overall views of an embodiment of the flat, mass-produced load cell of the present invention. As best illustrated in FIG. 1, the load cell is a flat arrangement of three elements: a flat middle beam 1 which acts as a flexure beam, a U-shaped loading element 2 which receives the load, and a wide mounting element 3 which anchors the load cell to a rigid plate. The flexure beam 1 has a narrow mid-section 4 on which electronic strain sensors 6 and 7 are bonded at equal distances from the center of the beam. The load on the loading element 2 is applied at the centers of the holes 5 which are directly across from each other along a line passing through the center-point of the flexure beam 1, so that there is no bending moment at the center-point of the flexure beam 1. The mounting element 3 is fastened to a plurality of small flat protrusions on a rigid plate through screw holes 8, so that the remainder of the load cell is elevated above the rigid plate and free to deflect downwards when the load cell is loaded from above.

FIG. 2 is a schematic illustration of the deformation of the load cell shown in side view in FIG. 1A when it is under load. The mounting element 8 anchors the load cell rigidly. When the load cell is loaded with equal weights 11 at the centers of the holes 5, the flexure beam bends downwards as a double cantilever into a symmetrical S-shape 12, with stresses of equal and opposite sign at points equi-distant from its mid-point along its main axis. As can be observed from FIG. 2, the top of the flexure beam stretches to the left of its mid-point and is therefore under tension, and compresses to the right of its mid-point and is therefore under compression.

FIG. 1 also shows a pair of electronic strain sensors, such as strain gages 6 and 7, bonded to one side of the narrow section of the flexure beam 1 with their centers equidistant from the center of the flexure beam 1, and equi-distant from the parallel edges of the narrow section of beam 1. These two gages form one half of a Wheatstone bridge and produce signals of equal and opposite signs when the load cell is under load, gage 6 decreasing in resistance due to compression, and gage 7 increasing in resistance by the same amount due to tension. This arrangement of the gages produces the same result even when the loads on the leading edges of the U-shaped loading element 2 are not exactly centered on the holes 5, or not exactly equal to each other as long as their sum remains the same, thus allowing the load cell to remain accurate under eccentric loads. The ends 9 and 10 of the flexure beam 1 are defined by a change in width of the outer U-shaped loading element 2 and the wider mounting element 3, and not by a change in thickness with spacers above or below. This prevents friction and the resulting hysteresis, and also makes it possible for the load cell to retain its original sensitivity when it is mounted in a scale.

FIGS. 3, 4. 4A and 4B show the preferred embodiment of a load cell of the present invention, which is an improvement of the embodiment shown in FIGS. 1, 1A and 1B. In this preferred embodiment, the wide mounting element which anchors the load cell is a U-shaped mounting element 13. Screw holes 14 are located along the line passing through the center of the flexure beam 1. When a load is applied to the loading element 2 at the centers of the holes 5, the area of the U-shaped mounting element 13 around the screw holes 14 presses on the rigid plate to which it is fastened (see FIG. 5) with the result that the U-shaped mounting element 13 does not produce strong bending moments on the plate. This configuration is particularly suited to scale embodiments that employ weaker plates which can deform appreciably when subject to concentrated bending moments.

FIG. 5 shows a plan view of a preferred embodiment of a scale incorporating a plurality of load cells of the present invention. In this preferred embodiment, there are four load cells located at the four corners of a rigid bottom plate 21. The upper load bearing plate 22 is broken away to display the inside of the scale mechanism.

The upper load bearing plate 22 rests on flat circular pads 23 of rigid, yet flexible material such as hard rubber, and is bonded to these pads with adhesive. The pads have small round extensions (see FIG. 6) which snap into the holes 5 in the loading element 2 of the load cell, and transfer the load applied to the load cell, concentrating it at the centers of holes 5 when the scale is loaded from above. These pads also act to resist impact when a weight is suddenly dropped on the scale, as well as to cancel lateral forces on the load cell, for example those forces which are created by the deflection of the top load bearing plate 22 under load.

The load cells are connected to the bottom plate 21 by screws 24, which fasten them to flat protrusions 25. The protrusions are located away from the edge of the flexure beam 1 so that mounting the load cells on the scale plate does not change their sensitivity. In the bottom plate 21 there are also two tapped holes 26 into which short screws are inserted from below as overload protection. To adjust the overload screws after assembly, the scale is loaded to the required maximum capacity and the overload screws are tightened from below until they reach the arms of the U-shaped loading element 2. They are then locked into place with adhesive, so that when the scale is in use the load cells are protected from loads above the maximum capacity.

Figure 6:
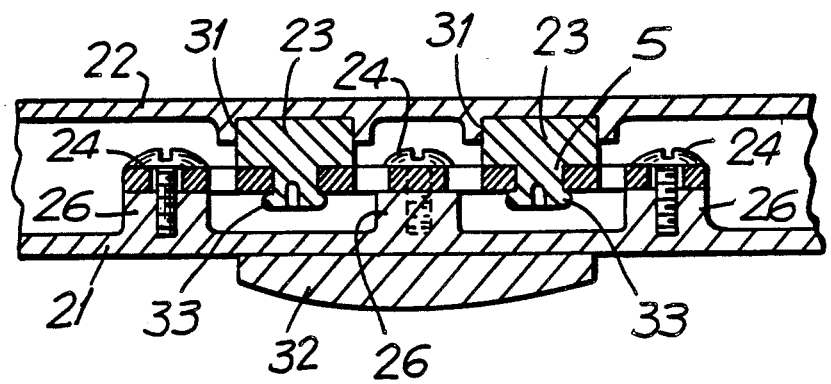
FIG. 6 is a cross-sectional elevation in the direction of arrows 6—6 in FIG. 5.

FIG. 6 shows a cross section of the preferred embodiment of a scale of the present invention along the lines 6—6 in FIG. 5. The circular pads 23 are bonded with adhesive to the top load bearing plate 22 and held in place in cavities 31. They are also connected to the load cell by snaps 23. This makes it possible to remove the top plate 22 for repairs by pulling it forcefully upwards, disengaging the snaps 23 from the holes 5 of the load cells, while at the same time making it possible to lift the scale without disconnecting the plates.

Under the bottom plate 21 below each load cell there is a shallow foot 32 with a spherical cross section made from flexible material—e.g. hard rubber—with its lowest point aligned with the center of the flexure beam 1 of the load cell, concentrating the force of the floor at the center of the load cell, and not creating any bending moments at the center of flexure beam 1.

When the top plate 22 is loaded, each of the four load cells is loaded individually, and each electronic strain sensor produces a signal which is proportional to the load on the load cell. The four half-bridges of the load cells can be connected in a full Wheatstone Bridge configuration, with one half-bridge at each corner of the Wheatstone Bridge, so that the full bridge produces a signal which is proportional to the sum of the loads on the four individual load cells. The signal is then amplified, translated by an analog-to-digital converter, transformed into a reading in pounds or kilograms and displayed digitally.

Figure 7:
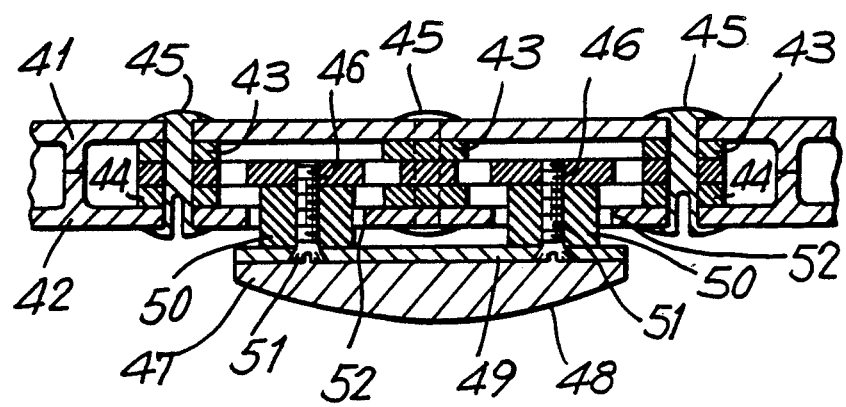
FIG. 7 is a cross-sectional elevation of an alternative, thinner embodiment of a scale employing a plurality of load cells of the present invention illustrated in FIGS. 4, 4A and 4B.

An alternative cross section is shown in FIG. 7 for another preferred embodiment of the scale of the present invention which can attain an even thinner vertical dimension. In this embodiment the top plate 41 and the bottom plate 42 are rigidly connected to each other, and the load cell is anchored between the two plates by spacers 43 and 44 and held in place by rivets 45. In this embodiment, the holes 46 of the U-shaped loading element 2 are tapped, and a circular foot 47 is connected to the U-shaped loading element 2 with screws 51. The foot 47 rests on two cylindrical spacers 50 which pass through circular holes 52 in the bottom plate 42. The foot is made of two layers, one being a steel disk 49 acting as a rigid bridge, and under it a flat spherical disc 48 of flexible material—e.g. hard rubber—which absorbs impact and concentrates the vertical force from the floor at the center of the flexure beam 1. In this embodiment, the scale measures the upward forces of the floor on the scale plate rather than the downward forces of a load on the top plate, both of which are identical.

It is clear that the load cell of the present invention can be modified to accept higher or lower maximum loads by varying its dimensions and by using a variety of materials of different elastic moduli. It is also clear that the shapes of the scales embodying such load cells can vary, as this highly simplified mechanism makes possible the design of scales in any shape and form, as well as the incorporation of load cells of the present invention in a variety of instruments and devices—e.g. beds, seats, exercising machines, sorting devices and a variety of containers—so that these devices can measure weight as well.

What is claimed is:

1. A low-profile load cell designed for mass production and comprising
   a. a one-piece, flat, mechanically-deformable metal part, stamped from a single piece of thin stock material, comprising
      (1) a flat flexure beam on which strain sensors are bonded,
      (2) a flat U-shaped loading element attached at its inner mid-section to one end of the flexure beam, with the leading edges of the U-shaped element reaching beyond the mid-point of the flexure beam, the U-shaped element being loadable at two points opposite each other across the midpoint of the flexure beam; and (3) a flat mounting element, wider than the flexure beam, attached at its mid-section to the other end of the flexure beam, the mounting element being fastenable to a plurality of flat protrusions on a rigid surface;

so that the flexure beam bends under a load as a double cantilever beam into a symmetrical S-shape, producing stresses of equal and opposite sign at points equi-distant from its mid-point along its main axis; and b. at least one pair of strain sensors mounted on at least one of the flat surfaces of the flexure beam, with their centers substantially along its main axis and substantially equidistant from its mid-point, each pair of sensors forming half a Wheatstone bridge and producing signals of nominally equal and opposite values when the load cell is under load.

2. The load cell of claim 1 wherein the mounting element attached to the flexure beam is a U-shaped element attached at its inner mid-section to the one end of the flexure beam, with the leading edges of the U-shaped mounting element reaching beyond the mid-point of the flexure beam on the outside of the U-shaped loading element, so that the U-shaped mounting element, when attached to a rigid plate, does not create moments on the rigid plate when the load cell is under load.

3. A low-profile scale embodying a plurality of the load cells defined in claim 2, comprising:

a. A plurality of said load cells;
b. A rigid bottom plate to which the mounting elements of the load cells are fastened on a plurality of flat protrusions;
c. At least two impact-resistant pads attached to the top surfaces of the leading edges of the U-shaped loading element and centered at points opposite each other across the mid-point of the flexure beam of each load cell;
d. A rigid top load bearing plate resting on and affixed to the impact resistant pads of the plurality of load cells;
e. Electronic means and power supply means for summing the output of the plurality of load cells, converting it to a digital signal, translating the digital signal into pounds or kilograms and displaying the resulting weight for viewing.

4. A low-profile scale embodying a plurality of the load cells defined in claim 2, comprising:

a. A rigid load bearing composite plate assembly made of top and bottom thin plates rigidly bonded together, and containing a plurality of cavities between the two plates;
b. A plurality of the said load cells mounted inside the cavities of the load bearing plate assembly, the U-shaped mounting elements of the respective load cells being rigidly anchored with spacers to the top and bottom plates so that the load cells float inside the respective cavities;
c. Shallow feet connected to the bottom of each U-shaped loading element at points opposite each other across the mid-point of the respective flexure beam through holes in the bottom plate, each foot comprising:
   1. At least two spacers extending downwards from the leading edges of the U-shaped loading element;
   2. A rigid bridge across the bottom of the flexure beam connecting the bottom of the two spacers below the bottom plate; and
   3. An impact-resistant pad attached to the bottom of the bridge, touching the floor at a point below the center of the flexure beam; and
c. Electronic means and power supply means for summing the output of the plurality of load cells, converting it to a digital signal, translating the digital signal into pounds or kilograms and displaying the resulting weight for viewing.

5. A low-profile scale embodying a plurality of the load cells defined in claim 1, comprising:

a. A plurality of said load cells;
b. A rigid bottom plate to which the mounting elements of the load cells are fastened on a plurality of flat protrusions;
c. At least two impact-resistant pads attached to the top surfaces of the leading edges of the U-shaped loading element and centered at points opposite each other across the mid-point of the flexure beam of each load cell.
d. A rigid top load bearing plate resting on and affixed to the impact resistant pads of the plurality of load cells;
e. Electronic means and power supply means for summing the output of the plurality of load cells, converting it to a digital signal, translating the digital signal into pounds or kilograms and displaying the resulting weight for viewing.

* * * * *

UNITED STATES PATENT AND TRADEMARK OFFICE
CERTIFICATE OF CORRECTION

PATENT NO. : 4,993,506

DATED : February 19, 1991

INVENTOR(S) : SHLOMO ANGEL

It is certified that error appears in the above-identified patent and that said Letters Patent is hereby corrected as shown below:

Column 3, line 2-3: Delete paragraph break between "moments." and "Such".

Column 4, line 6: Change "ar" to --are--.

Column 4, line 12: Change "near equal" to --near-equal--.

Column 4, line 24: Change "milivolt-per volt" to --milivolt-per-volt--.

Column 4, line 28: Change "adJust" to --adjust--.

Column 7, line 12: Change "3,4.4A" to --3,4,4A--.

Column 10, line 42: Change "cell." to --cell;--.

Signed and Sealed this

First Day of September, 1992

Attest:

DOUGLAS B. COMER

Attesting Officer

Acting Commissioner of Patents and Trademarks